(12) United States Patent
Dong et al.

(10) Patent No.: US 11,756,204 B2
(45) Date of Patent: Sep. 12, 2023

(54) DEPTH-AWARE METHOD FOR MIRROR SEGMENTATION

(71) Applicant: DALIAN UNIVERSITY OF TECHNOLOGY, Liaoning (CN)

(72) Inventors: Wen Dong, Liaoning (CN); Xin Yang, Liaoning (CN); Haiyang Mei, Liaoning (CN); Xiaopeng Wei, Liaoning (CN); Qiang Zhang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 295 days.

(21) Appl. No.: 17/336,702

(22) Filed: Jun. 2, 2021

(65) Prior Publication Data
US 2022/0230322 A1 Jul. 21, 2022

(30) Foreign Application Priority Data
Jan. 21, 2021 (CN) .......................... 202110078754.9

(51) Int. Cl.
*G06T 7/11* (2017.01)
*G06T 7/73* (2017.01)
(Continued)

(52) U.S. Cl.
CPC ............... *G06T 7/11* (2017.01); *G06N 3/08* (2013.01); *G06T 7/174* (2017.01); *G06T 7/74* (2017.01); *G06T 2207/10024* (2013.01); *G06T 2207/10028* (2013.01); *G06T 2207/20081* (2013.01); *G06T 2207/20084* (2013.01); *G06T 2207/20221* (2013.01)

(58) Field of Classification Search
CPC ... G06T 7/11; G06T 7/74; G06T 7/174; G06T 2207/10024; G06T 2207/10028; G06T 2207/20081; G06T 2207/20084; G06T 2207/20221; G06N 3/08
See application file for complete search history.

(56) References Cited

U.S. PATENT DOCUMENTS 8,824,779 B1 * 9/2014 Smyth ........................ G06T 7/73
382/117
9,619,731 B2 * 4/2017 Akama .................. G06V 10/42
(Continued)

*Primary Examiner* — Gregory M Desire
(74) *Attorney, Agent, or Firm* — Muncy, Geissler, Olds & Lowe, P.C.

(57) ABSTRACT

The invention belongs to scene segmentation's field in computer vision and is a depth-aware method for mirror segmentation. PDNet successively includes a multi-layer feature extractor, a positioning module, and a delineating module. The multi-layer feature extractor uses a traditional feature extraction network to obtain contextual features; the positioning module combines RGB feature information with depth feature information to initially determine the position of the mirror in the image; the delineating module is based on the image RGB feature information, combined with depth information to adjust and determine the boundary of the mirror. This method is the first method that uses both RGB image and depth image to achieve mirror segmentation in an image. The present invention has also been further tested. For mirrors with a large area in a complex environment, the PDNet segmentation results are still excellent, and the results at the boundary of the mirrors are also satisfactory.

1 Claim, 2 Drawing Sheets

(51) Int. Cl.
    *G06T 7/174*         (2017.01)
    *G06N 3/08*          (2023.01)

(56) References Cited

U.S. PATENT DOCUMENTS

| | | | |
|---|---|---|---|
| 10,210,628 B2 * | 2/2019 | Domae | G06T 7/70 |
| 10,242,294 B2 * | 3/2019 | Eldar | G06T 7/187 |
| 11,288,828 B2 * | 3/2022 | Wu | G06V 10/25 |
| 11,645,777 B2 * | 5/2023 | Isberg | G06T 3/60 |
| | | | 382/103 |
| 2021/0150227 A1 * | 5/2021 | Hu | G06V 10/25 |

* cited by examiner (a)

(b)

DEPTH-AWARE METHOD FOR MIRROR SEGMENTATION

TECHNICAL FIELD

The invention belongs to the scene segmentation methods in the computer vision field, and the specific realization result is the segmentation of image content, and particularly relates to a mirror segmentation method in real scenes.

BACKGROUND

Two-dimensional image segmentation refers to distinguishing the pixels belonging to different objects in the scene image and determining their size, shape, and position. It is a key step from image processing to image analysis and has great application value. But there are some special objects cannot be ignored in most scenes, such as mirrors. Such objects will greatly affect the understanding of the scene and then affect the accuracy of various computer vision tasks and applications. The characteristics of the mirror make the mirror area present the content of the scene in front of it. Diversity of the scene, diversity of objects in the scene, and diversity of direction and tilt angle of the mirror determine the variety of content presented in the mirror area. It is essentially different from other objects, so segmenting mirror in the scene is a very challenging task. Yet, mirrors confuse many vision systems as they are unable to distinguish real from reflected scenes. The scene segmentation methods related to mirror segmentation mainly include semantic segmentation and salient object detection.

Semantic Segmentation classifies and assigns a semantic label to each pixel in an image. Recent semantic segmentation methods rely on fully convolutional networks (FCNs) to model the contextual information. However, treating mirrors as an additional semantic category fails to produce satisfactory results as the visible mirror content is further semantically classified.

Salient Object Detection (SOD) identifies the most visually distinctive objects/regions in an image of a scene. The traditional SOD method relies on artificially set low-level features (such as color and contrast); the SOD method based on deep learning uses bottom-up and top-down saliency inference, combining the saliency estimation of local pixels and the search of global targets to perform salient object detection. In fact, the content reflected by mirrors is not necessarily salient, even if it is salient, it may only be partially salient. Therefore, the existing SOD method cannot solve the mirror segmentation.

Based on the investigation and analysis of the existing scene segmentation methods, we found the obvious features of the mirror in the depth image. We proposed a segmentation method combined with scene depth perception, and formed a scene segmentation method of positioning and delineating network of the mirror, namely PDNet. We observed that the depth estimation result of the ToF camera cannot reflect the true depth of the mirror surface, but the total length of the propagation path of the reflected light, which will produce obvious depth discontinuities at the mirror boundary, so PDNet combines depth perception to segment the mirror in the image. The input of PDNet is the RGB image containing mirrors and corresponding depth images. The output is the mirror mask images, the value of the mirror area in the mask image is 1, and non-mirror area is 0. Experiments have proved that this method combined with depth perception can effectively segment different mirrors in different scenes, improving accuracy and helping scene understanding.

SUMMARY OF THE INVENTION

The purpose of the present invention is to innovatively use depth perception for the scene's image to realize the mirror segmentation method PDNet. PDNet successively includes two multi-level feature extractors, a positioning module, and three delineating modules. The multi-level feature extractors use a traditional feature extraction network to extract contextual features; the positioning module combines the RGB feature information with the depth feature information to determine the position of the mirror in the image preliminarily; the delineating modules combine the RGB feature information of the image with the depth feature information to adjust and determine the boundary of the mirror. The method of this invention is suitable for the segmentation of mirrors with different positions, shapes, and sizes.

A depth-aware method for mirror segmentation, the method includes the following steps:

Step 1 Constructing a New Mirror Segmentation Dataset RGBD-Mirror

To segment mirrors in the image with a depth-aware method, the present invention first constructs a large-scale mirror segmentation dataset with depth information. The dataset contains 3049 groups of pictures, each group has an RGB mirror image, a corresponding depth image and a manually annotated mask image. The mirrors appearing in the dataset images are common in daily life, and the images cover different scenes, styles, positions, and numbers that ensure the dataset's completeness and structural accuracy. The dataset is randomly divided into training set and test set.

Step 2 Building PDNet

The mirror segmentation network PDNet is mainly composed of two multi-level feature extractors, a positioning module, and three delineating modules.

The two inputs of the multi-level feature extractor are the RGB image and corresponding depth image, both of which come from the mirror segmentation dataset mentioned in step 1. The realization of the multi-level feature extractor is based on the ResNet-50 with feature extraction capabilities. To improve the computational efficiency, the extracted RGB features and depth features are first performed channel reduction convolution and then sent to a positioning module and three delineating modules in turn. Given the RGB and depth features, the positioning module estimates the initial mirror location, as well as corresponding features for guiding the subsequent delineating modules, based on global and local discontinuity and correlation cues in both RGB and depth. The positioning module consists of two subbranches: a discontinuity perception branch and a correlation perception branch.

The discontinuity perception branch extracts and fuses the discontinuity features for the RGB domain ($D^r$), depth domain ($D^d$), and RGB+depth domain ($D^{rd}$). Each of these features is extracted by a common discontinuity block, and is the element-wise addition of local and global discontinuity features, $D_l$ and $D_g$, respectively (i.e. $D = D_l \oplus D_g$). Given a feature F, the local discontinuity feature $D_l$ is defined as the difference between a local region and its surroundings:

$$D_l = R(N(f_l(F, \Theta_l) - f_s(F, \Theta_s)))$$

where $f_l$, with corresponding parameters $\Theta_l$, extracts features from a local area using a convolution with a kernel size of 3 and a dilation rate of 1, followed by a batch normalization (BN) and a ReLU activation function. $f_s$, with corresponding parameters $\Theta_s$, extracts features from the surrounding using a convolution with kernel size of 5 and a dilation rate of 2, followed by BN and ReLU. While the local discontinuity feature captures the differences between local regions and their surroundings, under certain viewpoints, the reflected mirror image has little overlap with its surroundings. This case is represented by the global discontinuity feature:

$$D_g = R(N(f_l(F,\Theta_l) - f_g(G(F),\Theta_g)))$$

where, G is a global average pooling, and $f_g$ (with corresponding parameters $\Theta_g$) is a 1×1 convolution followed by BN and ReLU. The discontinuity block is applied to RGB, depth, and RGB+depth, and the resulting features $D^r$, $D^d$, and $D^{rd}$ are fused to produce the final output of the discontinuity perception branch:

$$D^{DPB} = R(N(\psi_{3\times3}([D^r, D^d, D^{rd}])))$$

where, [•] denotes the concatenation operation over the channel dimension, and $\psi_{t\times t}$ represents the convolution with a kernel size of t.

The correlation perception branch models correlations inside and outside the mirror. Simply combining the RGB and depth features, ignores cases where one of the domains does not exhibit meaningful correlations. To resolve this issue, we introduce a dynamic weighting that adjusts the importance of an input domain during fusion based on its quality. The correlation perception branch is inspired by the non-local self-attention model augmented with a dynamic weighting to robustly fuse the RGB and depth correlations, which adjusts the importance of an input domain during fusion based on its quality:

$$Y = g(F^{rd})(\alpha k(F^r) + \beta k(F^d)),$$
$$F^{rd} = R(N(\psi_{3\times3}(F^r \odot F^d))),$$
$$k(F) = \text{softmax}(\theta(F)^T \phi(F)),$$
$$g(F) = \psi_{1\times1}(F),$$
$$\theta(F) = \psi_{1\times1}(F), \phi(F) = \psi_{1\times1}(F),$$
$$\alpha = \frac{e^{\mu(F^r)}}{e^{\mu(F^r)} + e^{\mu(F^d)}}, \beta = 1 - \alpha,$$
$$\mu(F) = \psi_{1\times1}(R(N(\psi_{1\times1}(G(F)))))$$

where, $F^r$ and $F^d$ are the input RGB and depth features, $\alpha$ and $\beta$ are dynamic weights, © is the channel-wise concatenation operator. Finally, to enhance fault tolerance, we use a residual connection with a learnable scale parameter $\gamma$: $C^{CPB} = \gamma Y \oplus F^{rd}$.

The output results of the two branches $D^{DPB}$ and $C^{CPB}$ are added at the pixel level, and the result is the output of the positioning module.

Given high-level mirror detection features, either from the positioning module or previous level's delineating module, the delineating module refines the mirror boundary. The core of the delineating module is a delineating block that takes advantage of local discontinuities in both RGB and depth to delineate the mirror boundaries. Since such refinements should only occur in the region around the mirror, we leverage higher-level features from the previous module (either positioning module or delineating module) as a guide to narrow down the potential refinement areas. Given a feature F and corresponding high-level feature $F^h$, we compute a feature T as:

$$T = R(N(f_l(F \oplus F^{hg}, \Theta_l) - f_s(F \oplus F^{hg}, \Theta_s))),$$

$$F^{hg} = U_2(R(N(\psi_{3\times3}(F^h))))$$

where $U_2$ is a bilinear upscaling (by a factor 2). Similar as the discontinuity block, we apply the delineating block to RGB domain, depth domain, and RGB+depth domain, and fuse the features to obtain the final output feature $T^{DM}$ as the below equation:

$$T^{DM} = R(N(\psi_{3\times3}([D^r, D^d, D^{rd}])))$$

Step 3 Training Process

During training, images in the training set is first sent to multi-level feature extractor, and the extracted results are sequentially sent to a positioning module and three delineating modules. Then, the positioning module combines the highest level RGB and depth features to estimate the initial mirror location, and the delineating module combines high-level mirror detection features, either from the positioning module or previous level's delineating module to refine the mirror boundary. To improve the training, the positioning module and three delineating modules are supervised by ground truth mirror masks. Specifically, we compute the loss between the G and mirror segmentation map S predicted according to each of the features generated by the four modules as: $S = \psi_{3\times3}(x)$, where X is the output feature from either the positioning module or delineating module:

$$L = w_b l_{bce}(S, G) + w_i l_{iou}(S, G) + w_e l_{edge}(S, G)$$

where $l_{bce}$ is a binary cross-entropy loss, $l_{iou}$ is the map-level IoU loss, and $l_{edge}$ is the patch-level edge preservation loss; and $w_b=1$, $w_i=1$, $w_e=10$ are the corresponding weights for each of the three loss terms. The final loss function is then defined as:

$$L_{overall} = L_{pm} + 2L_{dm3} + 3L_{dm2} + 4L_{dm1}$$

In this way, PDNet can be guided to generate a more accurate mirror segmentation result based on the input RGB and corresponding depth image.

The beneficial effects of the present invention:

(1) Method Innovation

The present invention is the first method that uses RGB and depth information at the same time to realize mirror segmentation. This method innovatively uses RGB information, the semantic discontinuity of depth perception, and the mirror's internal and external correlation information. A new strategy of a dynamic weighting to robustly fuse the RGB and depth correlations is used in the correlation perception branch. PDNet is designed to solve the problem of mirror segmentation in computer vision tasks.

(2) The Result and Efficiency

As first method that uses RGB and depth information at the same time to realize mirror segmentation, the invention can successfully segment the mirror area from the image, even though the scene is complex. It eliminates the interference of the mirror with helping the visual system distinguish the content reflected in the mirror from the real scene. The method of the present invention relies on the depth perception of the scene, uses the discontinuity in RGB and depth, and the correlation between the inside and outside of the mirror to accurately segment the mirror. The comparative experiments have proved the accuracy of the PDNet's mirror segmentation. In the comparative experiments, PDNet has obtained the best performance on the four commonly used indicators (IoU, $F_\beta^w$, MAE, and BER), and the advantages are obvious. The present invention has also been further tested. For mirrors with large areas in complex environments, our segmentation results are still excellent, and the results at the borders of the mirrors are also satisfactory.

(3) Wider Applicability

The invention is suitable for the segmentation of various types of mirrors. PDNet has obvious performance advantages on the following types of images: a) images with small-sized mirrors; b) images with large-sized mirrors; c) images with mirror whose content is similar to the surrounding environment or the boundary is not clear; d) images with mirror obscured by a real object; e) images with multiple mirrors. All of the above proves the effectiveness and practicality of PDNet in different scenes.

DETAILED DESCRIPTION

The specific embodiments of the present invention will be further described below in conjunction with the drawings.

The mirror dataset RGBD-Mirror with depth information used in this embodiment contains 3049 groups of pictures, each group of pictures has an RGB mirror image, and a corresponding depth image and a manually annotated mask image. The dataset is randomly divided into a training set composed of 2000 groups of images and a test set composed of 1049 groups of images. The images with multiple sizes in the dataset will be uniformly scaled to 416×416 during training, and the output segmentation result images will be readjusted to the original size of the input image. The parameters of the feature extraction network are initialized by the pre-trained ResNet-50 network, and other parameters are initialized randomly.

In PDNet, the RGB and depth images are respectively passed through two multi-level feature extractors to obtain RGB and depth features, and the extracted result are sent to the positioning module and delineating module. The positioning module uses the global and local features of RGB and depth to predict the initial position of mirrors; the delineating module refines the boundary of the mirror based on the local discontinuities and the features of the previous level. The predicted output of the last delineating module is used as the final mirror segmentation result. The implementation of PDNet is based on PyTorch and use the stochastic gradient descent (SGD) optimizer for training with momentum set to 0.9, weight decay equal to $5\times10^{-4}$, batch size of 18, and using the poly strategy (basic learning rate of 0.001 and power equals 0.9). Training takes around 12 hours for 600 epochs on an 8-core i7-9700K3.6 GHz CPU, 64 GB RAM and an NVIDIA GeForce RTX 2080 Ti GPU.

Figure 1:
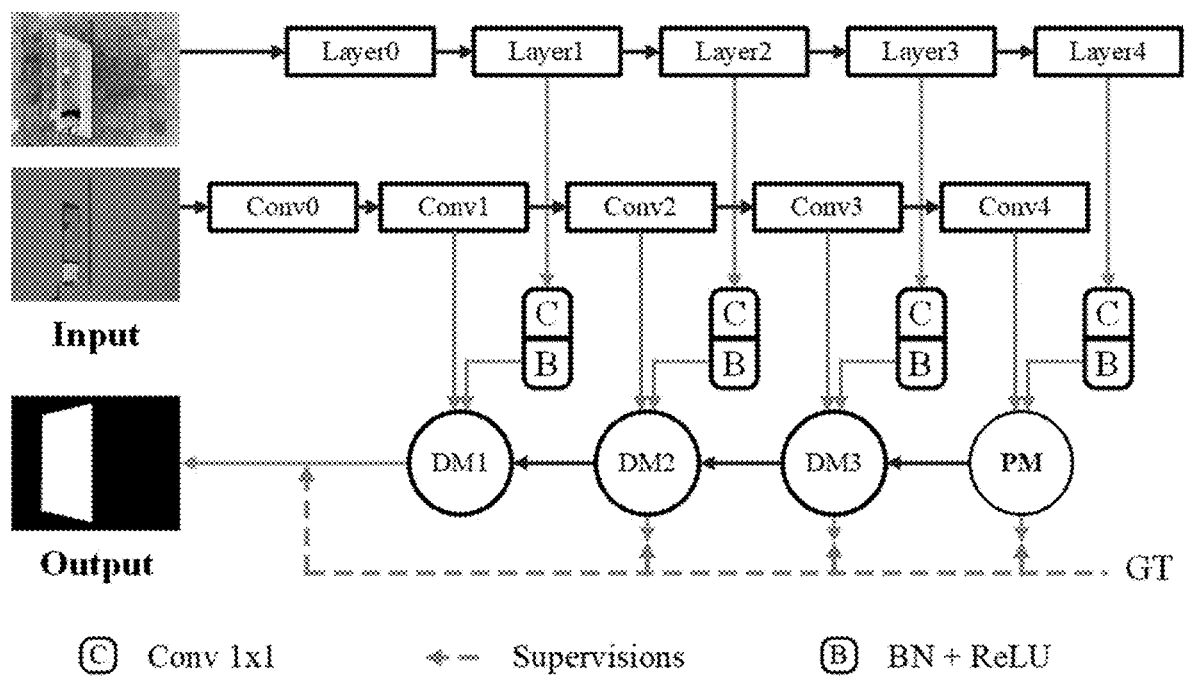
FIG. 1 is the network structure of PDNet.

FIG. 1 shows the network structure of PDNet. PDNet is comprised of two multi-level feature extractors that processes RGB and depth information, a positioning module, and three delineating modules. PDNet takes a pair of RGB images and corresponding depth images as input, and extracts features; the positioning module predicts the position of the mirror, the delineating module refines the mirror's boundary, and generates mirror mask images as the final segmentation result.

Figure 2:
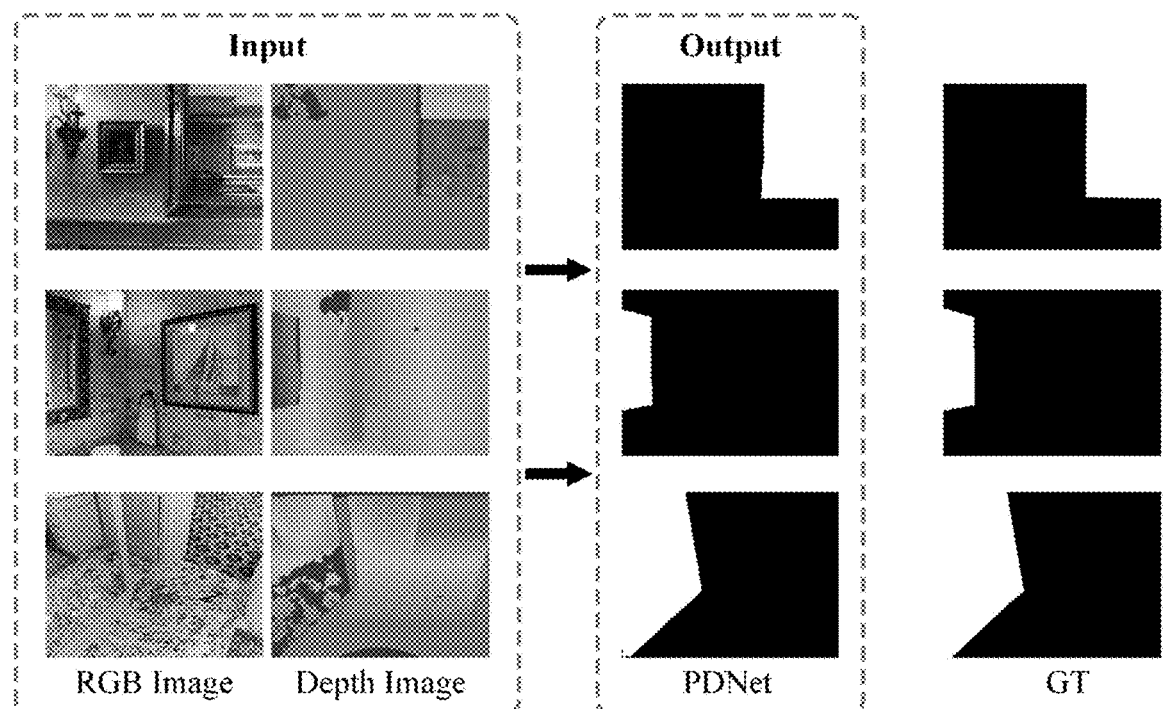
FIG. 2 is the results of PDNet and the comparative experiment, (a) the display of PDNet's result, (b) the display of the comparative experiment result.
Figure 2:
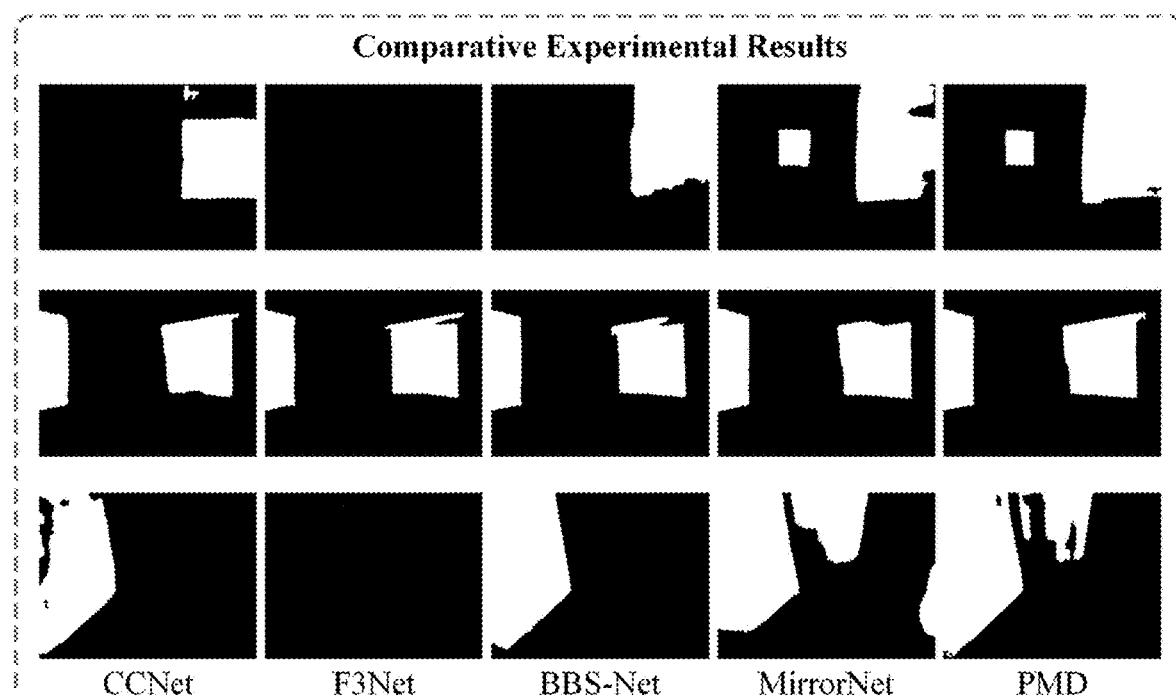

FIG. 2 displays the results of the embodiments of the present invention and the comparative experiments. FIG. 2(a) is the display of the PDNet's results. The rightmost column is the manually annotated mask images for comparison; FIG. 2(b) shows the results of comparison with other SOTA methods in the field (CCNet, F3Net, BBS-Net, MirrorNet, and PMD) to verify the effectiveness of PDNet. We retrained them using the publicly available codes on the same RGBD-Mirror training set, and tested them on the same RGBD-Mirror test set.

The invention claimed is:

1. A depth-aware method for mirror segmentation, comprising steps of:

step 1, constructing a new mirror segmentation dataset RGBD-mirror constructing a mirror segmentation dataset with depth information; a dataset contains multiple groups of pictures, each group has an RGB mirror image, a corresponding depth image and a manually annotated mask image; mirrors appearing in dataset images are common in daily life, and the images cover different scenes, styles, positions, and numbers; randomly splitting the dataset into training set and testing set;

step 2, building PDNet mirror segmentation network PDNet mainly consists of a multi-level feature extractor, a positioning module, and three delineating modules;

the multi-level feature extractor takes a RGB image and corresponding depth image as input, both of which come from the mirror segmentation dataset in step 1; realization of the multi-level feature extractor is based on ResNet-50 with feature extraction capabilities; taking as input the RGB and depth image pairs and first conducts channel reduction convolution for computational efficiency and then feeds features into the positioning module and three continuous delineating modules;

given RGB and depth features, the positioning module estimates initial mirror location, as well as corresponding features for guiding subsequent delineating modules, based on global and local discontinuity and correlation cues in both RGB and depth; the positioning module consists of two subbranches: a discontinuity perception branch and a correlation perception branch;

the discontinuity perception branch extracts and fuses discontinuity features for RGB domain ($D^r$), depth domain ($D^d$), and RGB+depth domain ($D^{rd}$); each of these features is extracted by a common discontinuity block, and is element-wise addition of local and global discontinuity features, $D_l$ and $D_g$, respectively, i.e. $D=D_l \oplus D_g$; given a feature F, the local discontinuity feature $D_l$ is the difference between a local region and its surroundings:

$$D_l = R(N(f_l(F,\Theta_l) - f_s(F,\Theta_s)))$$

where $f_l$ extracts features from a local area using a convolution with a kernel size of 3 and a dilation rate of 1, followed by a batch normalization (BN) and a ReLU activation function; $f_s$ extracts features from the surrounding using a convolution with kernel size of 5 and a dilation rate of 2, followed by BN and ReLU; while the local discontinuity feature captures the differences between local regions and their surroundings, under certain viewpoints, a reflected mirror image has little overlap with its surroundings; the global discontinuity feature represents this case:

$$D_g = R(N(f_l(F,\Theta_l) - f_g(G(F),\Theta_g))$$

where, G is a global average pooling, and $f_g$ is a 1×1 convolution followed by BN and ReLU; applying discontinuity block to RGB, depth, and RGB+depth, and fusing the resulting features $D^r$, $D^d$, and $D^{rd}$ to produce a final output of the discontinuity perception branch:

$$D^{DPB}=R(N(\psi_{3\times 3}([D^r,D^d,D^{rd}])))$$

where, [•] denotes a concatenation operation over the channel dimension, and $\psi_{t\times t}$ represents the convolution with a kernel size of t;

the correlation perception branch models correlations inside and outside the mirror; the correlation perception branch is inspired by a non-local self-attention model augmented with a dynamic weighting to robustly fuse RGB and depth correlations, which adjusts the importance of an input domain during fusion based on its quality:

$$Y = g(F^{rd})(\alpha k(F^r) + \beta k(F^d)),$$
$$F^{rd} = R(N(\psi_{3\times 3}(F^r \odot F^d))),$$
$$k(F) = softmax(\theta(F)^T \phi(F)),$$
$$g(F) = \psi_{1\times 1}(F),$$
$$\theta(F) = \psi_{1\times 1}(F), \phi(F) = \psi_{1\times 1}(F),$$
$$\alpha = \frac{e^{\mu(F^r)}}{e^{\mu(F^r)} + e^{\mu(F^d)}}, \beta = 1 - \alpha,$$
$$\mu(F) = \psi_{1\times 1}(R(N(\psi_{1\times 1}(G(F)))))$$

where, $F^r$ and $F^d$ are the input RGB and depth features, $\alpha$ and $\beta$ are dynamic weights, © is a channel-wise concatenation operator; finally, to enhance fault tolerance, the positioning module uses a residual connection with a learnable scale parameter γ: $C^{CPB}=\gamma Y \oplus F^{rd}$;

adding an output results of two branches $D^{DPB}$ and $C^{CPB}$ at a pixel level, and the result is a output of the positioning module;

given high-level mirror detection features, either from the positioning module or previous level's delineating module, the delineating module refines a mirror boundary; the core of the delineating module is a delineating block that takes advantage of local discontinuities in both RGB and depth to delineate the mirror boundaries; since such refinements should only occur in a region around the mirror, leveraging higher-level features from the previous module (either positioning module or delineating module) as a guide to narrow down potential refinement areas; given a feature F and corresponding high-level feature $F^h$, the delineating module computes a feature T as:

$$T=R(N(f_l(F \oplus F^{hg},\Theta_l)-f_s(F \oplus F^{hg},\Theta_s))),$$
$$F^{hg}=U_2(R(N(\psi_{3\times 3}(F^h))))$$

where $U_2$ is a bilinear upscaling (by a factor 2); similar as the discontinuity block, the delineating module applies the delineating block to RGB domain, depth domain, and RGB+depth domain, and fuses the features to obtain a final output feature $T^{DM}$ as the below equation:

$$T^{DM}=R(N(\psi_{3\times 3}([D^r,D^d,D^{rd}])))$$

step 3, training process during training, an input of the multi-level feature extractor is the images in the training set, and the positioning module and three delineating modules take extracted results as input; then, the positioning module combines highest level RGB and depth features to estimate an initial mirror location, and the delineating module combines high-level mirror detection features, either from the positioning module or previous level's delineating module to refine the mirror boundary; to improve the training, the positioning module and three delineating modules are supervised by ground truth mirror masks annotated manually; computing a loss between the G and mirror segmentation map S predicted according to each of the features generated by the four modules as: $S=\psi_{3\times 3}(X)$, where X is an output feature from either the positioning module or delineating module:

$$L=w_b l_{bce}(S,G)+w_i l_{iou}(S,G)+w_e l_{edge}(S,G)$$

where $l_{bce}$ is a binary cross-entropy loss, $l_{iou}$ is a map-level IoU loss, and $l_{edge}$ is a patch-level edge preservation loss; and $w_b=1$, $w_i=1$, $w_e=10$ are the corresponding weights for each of the three loss terms; a final loss function is then defined as:

$$L_{overall}=L_{pm}+2L_{dm3}+3L_{dm2}+4L_{dm1}$$

a function can guide PDNet to generate a more accurate mirror segmentation result based on the input RGB and corresponding depth image.

\* \* \* \* \*